United States Patent [19]

Veaux et al.

[11] Patent Number: 4,530,425

[45] Date of Patent: Jul. 23, 1985

[54] SHOCK ABSORBER

[75] Inventors: Jacques Veaux, Chatillon; Andre Turiot, Morsang-sur-Orge, both of France

[73] Assignee: Messier-Hispano-Bugatti (S.A.), Montrouge, France

[21] Appl. No.: 498,486

[22] Filed: May 26, 1983

[30] Foreign Application Priority Data

Jun. 3, 1982 [FR] France ................. 82 09644

[51] Int. Cl.³ ............................... F16F 9/44
[52] U.S. Cl. .................... 188/299; 188/319; 188/320; 188/322.17
[58] Field of Search ............... 188/299, 313, 317, 318, 188/319, 280, 282, 283, 284, 285, 286, 287, 288, 322.15, 322.16, 322.17, 320; 267/64.27, 64.23

[56] References Cited

U.S. PATENT DOCUMENTS

| | | | |
|---|---|---|---|
| 2,493,290 | 1/1950 | Hearne | 788/319 |
| 2,691,518 | 5/1954 | Smith | 267/64.27 |
| 3,176,802 | 3/1962 | Zeidler | 267/64.23 |
| 3,362,508 | 1/1968 | Mayer | 188/319 |
| 3,827,538 | 8/1974 | Morgan | 188/319 |

FOREIGN PATENT DOCUMENTS

| | | | |
|---|---|---|---|
| 0754307 | 11/1933 | France | 267/64.27 |
| 1286812 | 1/1962 | France | 188/313 |
| 1508169 | 1/1968 | France . | |
| 2390637 | 5/1968 | France . | |
| 1525585 | 8/1978 | France . | |
| 2036246 | 6/1980 | United Kingdom . | |

Primary Examiner—Bruce H. Stoner, Jr.
Assistant Examiner—Alvin Oberley
Attorney, Agent, or Firm—McAulay, Fields, Fisher, Goldstein & Nissen

[57] ABSTRACT

A shock absorber including a cylinder (501), a rod (502) slidably mounted in the cylinder, and a piston (506) fixed to the rod and slidable inside the cylinder. The piston divides the cylinder into two oil-filled chambers (508, 514) and there is a third chamber (518) in the rod and including air to act as a hydraulic spring. Shocks tend to move the piston along the rod away from its equilibrium position therein, and the hydraulic spring tends to return the piston to its equilibrium position. Damping is provided by variable aperture channels between the first chamber (508) and the other two chambers (514 and 518). The channels comprise orifices (509 and 510) in a cylindrical wall of the first chamber (508) which overlap orifices in a movable cylindrical valve plate (527). A control shaft (540) leading out along the axis of the shock absorber serves to rotate the valve plate and to move it in axial translation. By ensuring that each pressure acting axially on any part of the valve plate and control shaft assembly acts on equal areas facing in opposite directions, there is little tendency for the valve plate to be moved off a setting applied thereto by the control shaft.

20 Claims, 12 Drawing Figures

FIG. 7
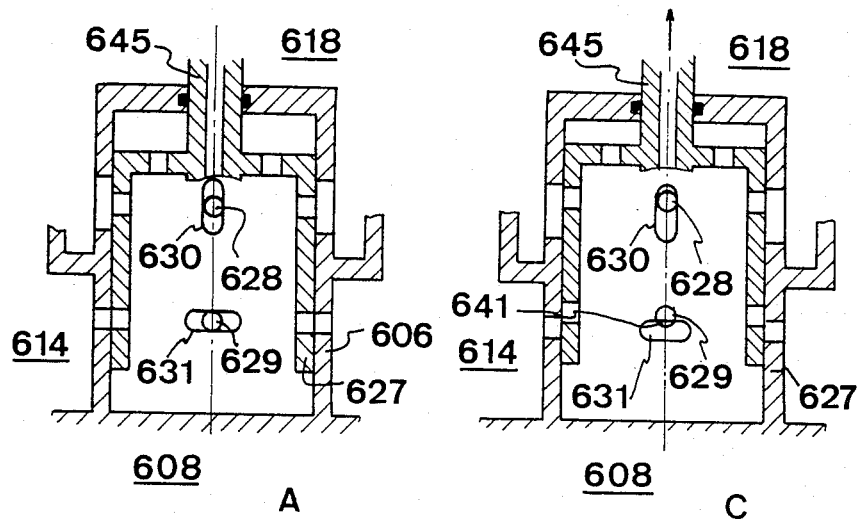
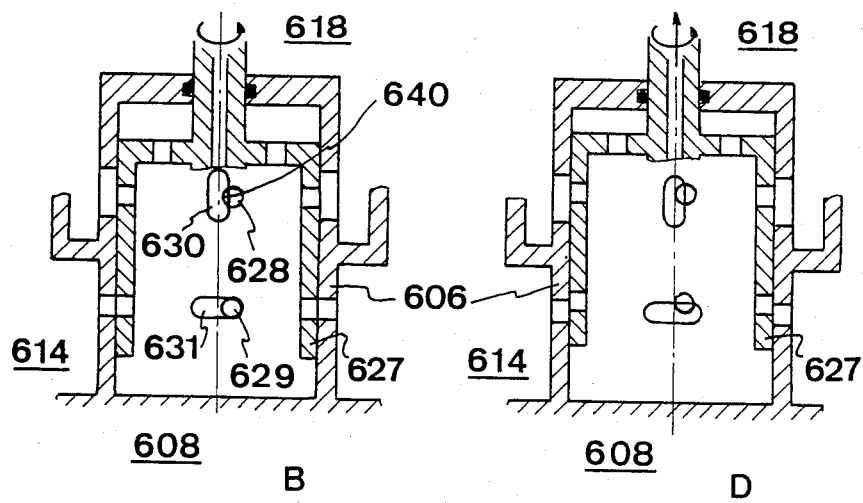

SHOCK ABSORBER

The present invention relates to fluid type shock absorbers as used on vehicles such as motor cars, aerodynes, etc. It relates more particularly to shock absorbers in which the damping coefficient is adjustable in use.

BACKGROUND OF THE INVENTION

Generally speaking, a shock absorber comprises a cylinder having a rod slidable therein by means of a piston which defines at least two, and preferably three, chambers.

Communication means are provided in the piston to enable fluid to pass from one chamber to another via fluid passages of predetermined cross section.

By way of example, the accompanying FIG. 1 shows a conventional shock absorber.

It comprises a hollow cylinder 1 in which a hollow rod 2 is slidably mounted.

The rod 2 is slidable in the cylinder 1 by means of a piston 3 which divides the interior 4 of the cylinder 1 into two separate chambers 5 and 6 whose volumes vary inversely as the piston 3 moves along the cylinder 1.

Further, in the illustrated example, the piston 3 includes two communication means of the non-return type.

A first non-return valve 7 serves to put the chamber 5 into communication with the chamber 6, and is placed to allow free fluid flow from the chamber 5 into the chamber 6, while providing considerable throttling when the fluid is made to flow from the chamber 6 into the chamber 5.

A second non-return valve 8 serves to put the chamber 5 into communication with the chamber 9 inside the rod 2, and is placed to pass fluid preferentially from the chamber 9 to the chamber 5, while providing considerable throttling, i.e. restriction to the flow of fluid, from the chamber 5 to the chamber 9.

As is well known to the person skilled in the art, the rod 2 enters the cylinder 1 via a sealed passage 10 having a substantially leak-proof sealing ring 11. Similarly, the piston 3 is completely surrounded by a sealing ring 13 which slides against the wall 12 of the cylinder 1 and provides moderately good sealing, even though it need not be completely leak-proof.

Although the operation of such a shock absorber is known, it is recalled that when such a shock absorber is used to connect the chassis of a vehicle to a running gear such as a wheel, and when the wheel undergoes shock, the shock causes the rod 2 to move relative to the cylinder 1.

There are two possible cases:

In the first case the rod 2 is pushed further into the cylinder causing the fluid in the chamber 5 to pass relatively easily to fill the chamber 6, while being throttled by the valve 8 as it flows into the chamber 9.

It should be observed that the fluid is generally an incompressible oil which does not completely fill all three of the chambers 5, 6, and 9, but which leaves an empty space above a fluid top surface, i.e. in the present example, above the surface 14 of the fluid contained in the rod 2 and below the end 15 of the rod. The empty space is filled with a fluid such as air or some other compressible gas, thus providing a fluid spring to return the rod to its equilibrium position once a shock has been absorbed.

The second case is the opposite of the first, i.e. the rod 2 is pulled further out from the cylinder 1. In this case the fluid contained in the chamber 9 passes readily into the chamber 5 without significant throttling. At the same time the volume of the chamber 6 tends to be reduced, thereby driving fluid from the chamber 6 into the chamber 5. This fluid is throttled by the valve 7 thus providing the desired damping just as the valve 8 provided the damping in the first case.

Such shock absorbers are well known to the person skilled in the art. They have been in use for a long time, in particular for equipping numerous vehicles such as those mentioned above.

Of such vehicles, particular mention can be made of aircraft of all types, e.g. airplanes and helicopters. Known shock absorbers provide good results and have been successful up to the present. However, persons skilled in the art have understandably sought to further improve this type of shock absorber which, under some conditions, suffers from a drawback in that the valves 7 and 8 throttle at a rate which is structurally determined and which is therefore set once and for all during manufacture. In other words it is impossible to vary the degree of fluid damping provided by the throttling, and this can be inconvenient for shock absorbers mounted on aircraft.

Such vehicles do not always encounter the same running conditions on the surface of all the different runways they use. Surface smoothness is not the same from one runway to the next, and some have bumps in unexpected places.

Thus, to improve such shock absorbers, the Applicant has studied a particular type of shock absorber in which the values of the fluid passages through different valves such as the valves 7 and 8 are capable of being adjusted.

One embodiment of such a device is described, in particular, in French patent application No. 80/18733 filed on the Aug. 29, 1980 and entitled "Shock Absorber".

In said device, the sections of the various valve passages are controlled by sliding rods which enable the values of said fluid passage cross sections to be varied, e.g. as a function of the forces which the shock absorber has to absorb or damp.

Said device has proved satisfactory, but the Applicant has sought to obtain even better results, in particular by enabling the valves which control the fluid passages to be moved more quickly and more easily.

SUMMARY OF THE INVENTION

The present invention provides a shock absorber comprising:
  a cylinder;
  a rod slidably mounted in said cylinder;
  piston means fixed to said rod and slidable inside said cylinder, and defining, in conjunction with said cylinder, at least two chamber of volume which is variable as a function of the displacement of the rod in the cylinder, said piston means including a first wall portion disposed between said chambers, said first wall portion being in the shape of a right cylinder;
  at least one first communication orifice in said first wall portion to enable a fluid to pass from one chamber to the other;

at least one auxiliary chamber having at least a second wall portion which is common to at least one of said two chambers;

an opening in said second wall portion;

a shutter closing said opening and capable of moving relative to said opening while keeping it constantly closed, said opening being defined by edges including at least two seals, said seals being situated on a common right cylindrical surface;

a frictionally moving valve member suitable for moving over said first wall portion to close said at least one communication orifice by an amount determined as a function of its displacement;

link means connecting said shutter to said valve member in such a manner that displacement of the shutter causes corresponding displacement of the valve member; and means for controlling the displacement of said shutter.

In one embodiment said moving shutter is completely located to one side of said opening.

In another embodiment said shutter passes through said opening and comes into contact with its edges on different sides thereof.

In another aspect, the present invention provides a shock absorber comprising:

a hollow cylinder;

a hollow rod slidably mounted in said cylinder;

piston means fixed to said rod to constitute, together with said cylinder and said rod, at least three chambers, said piston means comprising at least a first right cylindrical wall between at least one first chamber and at least two other, second and third, chambers, said first wall having first and second parts of different diameters, said first part separating the first and the second chambers and said second part separating the first and the third chambers;

first and second communication means provided through said first and second parts of said first wall;

valve means comprising at least a second right cylindrical wall including third and fourth parts suitable for sliding over said first and second parts respectively of said first wall, and respectively in at least said second and third chambers, said first through fourth parts of said first and second wall portions defining an annular space forming part of said second chamber;

third and fourth communication means provided through said third and fourth parts respectively of said second wall portion and suitable for co-operating with said first and second communication means respectively, whereby the amount of fluid communication between the chambers can be varied in determined manner by sliding said second wall portion over said first wall portion;

an auxiliary chamber having at least one opening communicating with said second chamber;

a shutter suitable for moving relative to said opening and for keeping it closed by means of two seals defining two sealing curves, said curves lying on a common right cylindrical surface, the ends of said shutter co-operating with respective ones of said seals and being situated on opposite sides of said right cylindrical surface whereby one end is inside the second chamber and the other end is inside the auxiliary chamber;

link means connecting said shutter to said valve means in such a manner that displacement of said shutter causes a corresponding displacement of said valve means; and means for controlling displacement of said shutter.

In a third aspect, the present invention provides a shock absorber comprising:

a hollow cylinder;

a hollow rod slidably mounted in said cylinder;

piston means fixed to said rod to constitute, together with said cylinder and said rod, at least three chambers, said piston means comprising at least a first right cylindrical wall between at least one first chamber and at least two other, second and third, chambers, said first wall having first and second parts, said first part separating the first and the second chambers and said second part separating the first and the third chambers;

first and second communication means provided through said first and second parts of said first wall;

valve means comprising at least a second right cylindrical wall including third and fourth parts suitable for sliding over said first and second parts respectively of said first wall, and located in said first chamber;

third and fourth communication means provided through said third and fourth parts respectively of said second wall portion and suitable for co-operating with said first and second communication means respectively, whereby the amount of fluid communication between the chambers can be varied in determined manner by sliding said second wall portion over said first wall portion;

an auxiliary chamber having at least one opening communicating with said first chamber;

a shutter suitable for moving relative to said opening and for keeping it closed by means of two seals defining two sealing curves, said curves lying on a common right cylindrical surface, the ends of said shutter co-operating with respective ones of said seals;

link means connecting said shutter to said valve means in such a manner that displacement of said shutter causes a corresponding displacement of said valve means; and means for controlling displacement of said shutter.

BRIEF DESCRIPTION OF THE DRAWINGS

Embodiments of the invention are described by way of example with reference to the accompanying drawings, in which:

FIG. 7 comprises four diagrams A, B, C, and D for explaining the operation of the valve plate shown in FIG. 6.

DETAILED DESCRIPTION

Figure 2:
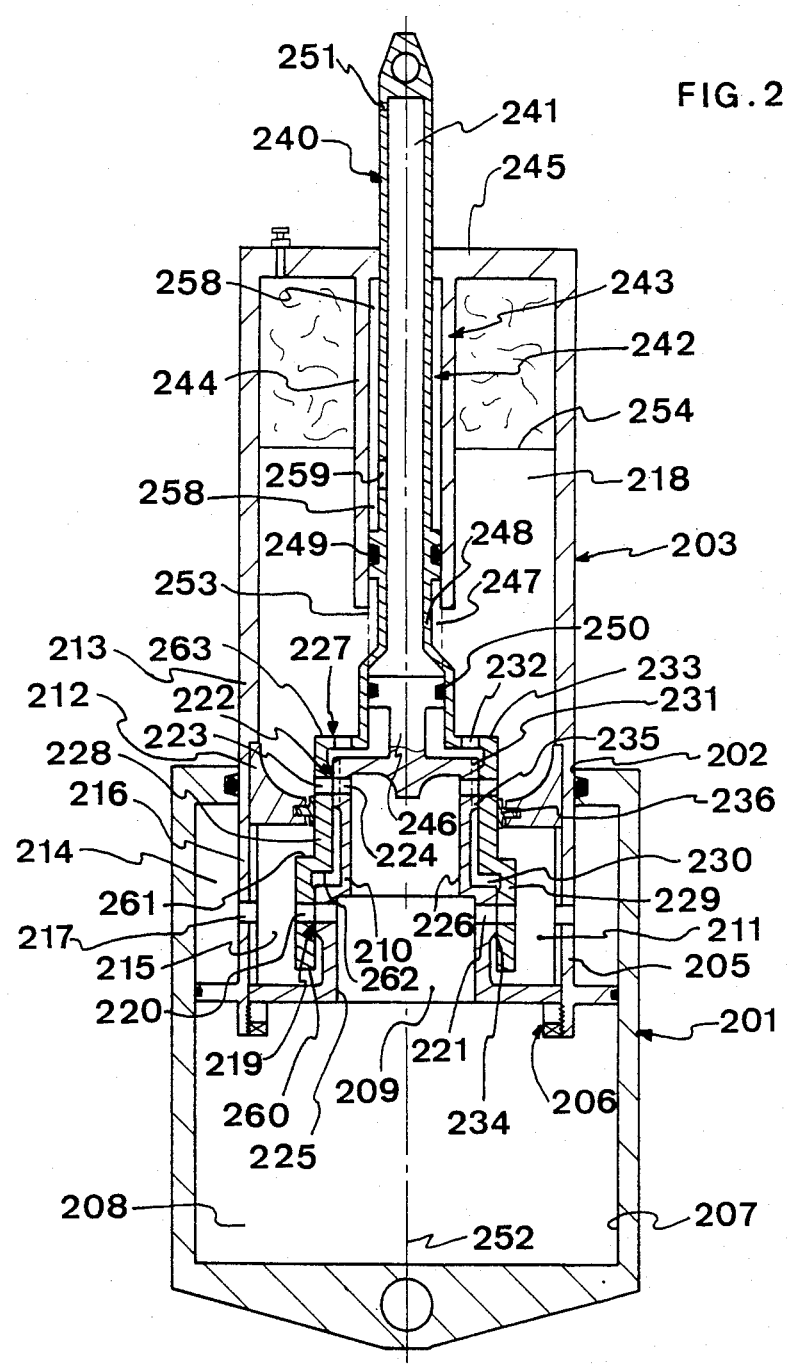
FIG. 2 is a cross section through a first embodiment of the invention comprising a three-chamber shock absorber.

FIG. 2 shows a first advantageous embodiment of a shock absorber in accordance with the invention and capable of being mounted on an aircraft.

The shock absorber comprises a cylinder 201 having an opening 202 through which a hollow rod 203 is mounted to slide in sealed manner.

The rod's end 205 inside the cylinder 201 bears piston means 206 which, together with the inside wall 207 of the cylinder 201, define a plurality of chambers which are in communication with one another via fluid passing openings.

A first chamber 208 extends between the end of the cylinder 201 and a stepped back portion 209 delimited by part of the wall 210 of the piston means 206.

A second chamber comprises the substantially annular space 211 lying between the piston means 206, the wall 210 of the piston means, and a sealing ring 212 which is fixed to the wall 213 of the rod 203.

In this embodiment, the annular chamber 211 is divided for constructional reasons into two portions 214 and 215 which are delimited by a portion 216 of the wall 213 of the rod 203, and which communicate with each other via a passage 217.

A third chamber 218 is essentially defined by the rod 203, and is delimited at one end by the sealing ring 212 and the cylindrical wall 210 of the piston means 206.

As mentioned above, fluid passing means are provided between the chamber 208 and the chamber 211. These means are constituted by orifices 219 which are obtained, as explained below, by aligning two orifices 220 and 221 respectively which are capable of moving relative to each other to vary the section of the passage as a function of said movement of one relative to the other.

The communication means between the chamber 208 and the chamber 218 is also obtained by a fluid passing orifice which, like the orifice 219, results from lining up two orifices 223 and 224 which are capable of moving relative to each other as a function of a determined law to obtain an orifice of variable section.

As mentioned above, the said first orifices 221 and 224 extend through two levels 225 and 226 respectively of the cylindrical wall portion 210 of the piston means 206.

In contrast, the second groups of orifices 220 and 223 extend through a valve plate 227 which is cylindrical and complementary in shape to the cylindrical wall portion 210, and which covers the outside of the portion 210 in such a manner as to be able to move relative thereto either in rotation or in translation, or even using both movements in combination, whereby the groups of orifices 220 and 223 may be moved relative to the groups of orifices 221 and 224.

Naturally, the valve plate 227 also includes two stages 228 and 229 in this embodiment. These two stages are defined by the two different diameters of cylindrical portions of the wall 210 and the valve plate 227 respectively. This is done in such a way as to define an annular space 230 between said stages, i.e. between the wall and the valve plate. The annular space 230 communicates with the chamber 218 only via the orifices through the wall 210, which orifices comprises a first orifice 231 through the wall 210 and drawn with a dashed line, and a second orifice 232 through the top 233 of the valve plate 227 where it covers the cylindrical portion 210 of the piston means 206. The second orifice 232 is drawn in solid lines.

Clearly the rod 203 moves into or out from the cylinder 201 depending on the direction of the shock to be damped, and since the wall 210 is fixed relative to the wall 213 of the rod 203, the valve plate 227 moves with the same motion as the rod 203 in addition to its own possible motion in rotation or translation, or indeed both at once as mentioned above (said motion being relative to the piston means 206).

In this case the friction seal between the groups of orifices, i.e. the portions 234 and 235 respectively for the groups of orifices 220-221 and 223-224, provide sufficient sealing to avoid fluid leaking between the contacting spaces 234.

As the valve plate 227 is movable relative to the wall 213 of the rod, the seal 212 between the chamber 211 and the chamber 218 is obtained by a friction seal of known type and represented diagrammatically at 236.

As mentioned above, it is thus necessary to move the valve plate 227 in rotation or in translation or in both together relative to the piston means. For this purpose the valve means advantageously include a shaft 240 having an axial bore 241.

The shaft 240 extends along an auxiliary chamber 242 defined by a part of the rods 203's wall portion 243 which includes a first portion 244 fixed to the end 245 of the rod 203, and a second portion constituted by the end 246 of the cylindrical portion 226 of the piston means 206, with said second portion constituting a "head". Since both the first and the second portions of the wall (244 and 246 respectively) are fixed to the rod, they define a fixed circular opening 247.

The shaft 240 has a flared shutter portion 248 passing from the inside of the auxiliary chamber 242 to the outside thereof via said opening 247 to enter the chamber 218.

The opening 247 is kept closed by the shutter portion 248 to ensure that the interior of the auxiliary chamber 242 is never put into communication with the interior of the chamber 218.

Further, since the shaft 240 is subjected to translation and/or rotation, it engages both ends of the circular opening 247 via respective seals 249 and 250.

The seal 249 is disposed in the shaft 240 while the seal 250 is disposed on the head 246.

Further, in order to obtain the required results as explained below, both seals 249 and 250 are so shaped that their respective contact curves which provide the sealing are situated on right cylindrical surfaces.

The bore 241 includes means for maintaining a substantially constant pressure therein, which can be performed in conventional manner by a bleed opening 251 through the end of the shaft 240 and leading to the atmosphere.

In the present context the term "right cylindrical surface" is used to include any surface traced by a generator line being displaced parallel to itself round a closed curve in plane perpendicular to the generator line. However, the most advantageous right cylindrical surface is naturally one in which said closed curve is a circle centered on the axis 252 of the shock absorber as a whole.

In this case, the two seals 249 and 250 will advantageously lie in the same right circular cylinder 253 about the axis 252 as shown by dotted lines.

Finally, as in any conventional shock absorber, the FIG. 2 shock absorber is partially filled with an incompressible fluid such as oil up to a level 254 which is chosen so as to leave sufficient space up to the top end 245 of the rod 203 for filling with a compressible fluid to provide the required degree of resilience.

Naturally the pressure inside the auxiliary chamber 242, and more particularly in the space 258 between the outside of th shaft 240 and the inside of the wall 244 must be the same as the pressure inside the bore 241, and hence, it is advantageous to provide a hole 259 through the wall of the shaft 240 to put the bore 241 into communication with the space 258.

The operation and advantages of a shock absorber such as the shock absorber described with reference to FIG. 2, are as follows:

The shock absorber shown in FIG. 2, as mentioned above, is intended to mounted on a vehicle such as an aircraft, to absorb the shocks which may be applied to the landing gear supporting the vehicle.

In such a case, when a shock is transmitted to a wheel which is connected to the cylinder 201, the rod and the cylinder tend to move relative to each other in one direction or the other depending on the direction of the shock. Thus, the rod either tends to penetrate further into the cylinder, i.e. when the wheel hits a bump, or else it tends to move out from the cylinder, as when the wheel passes over a pot-hole.

In either case, the shock absorber operates in much the same manner regardless of the kind of shock it has to absorb.

Figure 1:
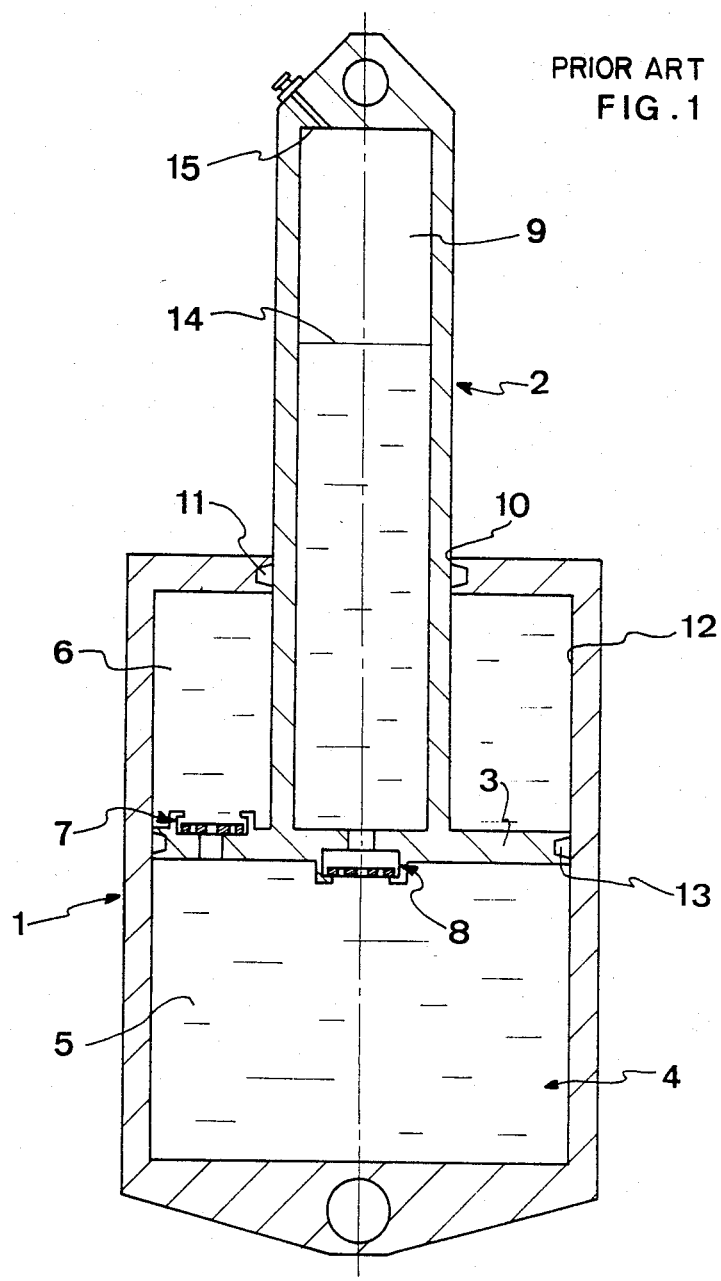
FIG. 1 is a cross section through a conventional prior art shock absorber which is described above.

Suppose that the shock causes the cylinder 201 to rise. This causes the rod 203 to penetrate further into the cylinder. As outlined above with reference to FIG. 1, this causes fluid to be transferred from one of the chambers to the other two via various orifices.

The shock must be absorbed by throttling the fluid flow as it passes from one chamber to another.

Returning to the particular embodiment shown in FIG. 2, when the rod 203 penetrates further into the cylinder 201, the fluid contained in the chamber 208 has to flow via the pair of orifices 223, 224 to fill the chamber 218 against the pressure exerted by the fluid spring by virtue of the reduction in the volume of the chamber 208.

However, the chamber 211 tends to increase in volume, and a portion of the fluid from the chamber 208 flows into the chamber 211 to compensate the void which tends to be created therein.

The fluid flows through the pair of orifices 220, 221. The shock is essentially damped by the throttling obtained as the fluid flows through the orifices 223 and 224.

The fluid is throttled in known manner by regulating the aperture of the fluid-passing orifices between the chambers.

To obtain a reduction in the fluid passage, the valve plate 227 is moved in translation, for example, so that the pair of orifices 223 and 224 which are opposite each other, as can be seen in FIG. 2, are no longer completely opposite each other, but have their centers offset to reduce the cross section of the fluid-passing passage.

The required quantity of valve plate movement is difficult to define. Only experiment can give reliable results. Further, the movement should be obtained automatically by means such as those described in the present Assignee's above-mentioned prior patent application.

To move the valve plate 227 relative to the cylindrical wall 210, the shaft 240 is actuated by applying a predetermined translation, rotation or combination of both of said motions thereto, thereby moving the shutter portion 248 which in turn moves the valve plate 227 and the wall portion 233.

The shutter portion 248 thus always remains in a position to keep the opening 247 closed, preventing any of the oil in the chamber 218 from leaking into the auxiliary chamber 242, by virtue of the seals 249 and 250.

Then, once the shock has ceased to act against the fluid spring, the shock absorber tends to return to its initial equilibrium condition, and in this case the fluid flows back between the various chambers in the reverse direction.

During return to the equilibrium position, the fluid flow is throttled as the chamber 214 tends to reduce in volume rejecting surplus oil into the chamber 208.

In this case it is also necessary to damp the movement of the rod relative to the cylinder. Thus the valve plate 227 can be set to reduce the effective flow passage through the orifices 220 and 221, by moving the centers of said relative to each other as explained above.

Thus, in conventional manner, this "active control" shock absorber can operate just like a prior art shock absorber. However, it is also capable of varying its throttling capacity by suitable action on the shaft 240 which then moves the valve plate 227 to vary the fluid-passing cross section of the orifices providing communication between the chambers of the shock absorber (three in the present case, but the same principle can be applied to a two-chamber shock absorber).

It can thus be seen that the throttling orifices can be set either during compression strokes when the rod 203 penetrates further into the cylinder 201 or during expansion strokes when the same rod 203 tends to move out from the cylinder 201.

To obtain good results from such a shock absorber, it is clear that the valve plate 227 must be moved in rotation or in tanslation as quickly as possible.

One of the conditions for obtaining fast motion of a valve plate such as the plate 227 which is situated opposite to a seat such as as the wall 210, particularly when friction is involved, is that there is a minimum force to be applied to the moving part, i.e. to the valve plate 227, and therefore that the pressures acting on the moving part should all be the same to ensure that the valve is in equilibrium.

The embodiment shown in FIG. 2 makes it possible to obtain such results on all the moving parts.

Thus, the cross sections of the valve plate 227 in a diection perpendicular to its right cylindrical shape (and as shown its right circular cylindrical shape) are all equal and subjected to the same pressures.

In particular, the portion of the second stage which is constituted by the wall 260 through which the orifice 220 passes has two sections 229 through which an orifice 220 is made, and has two cross sections 260 and 261 which are equal and which are subjected to equal pressure in the chamber 211, 215. This happens because the outside diameter of the first stage 228 is equal to the inside diameter of the second stage 229 since both surfaces are on the same cylinder.

In contrast, the wall of the first stage defined by the portion 228 has two equal sections 262 and 263 which are both situated in the same chamber 218, i.e. which are always subjected to the same pressure, since the chamber 218 is defined, inter alia, by the upper part of the rod 203 and also by the orifices 231 and 232 and the space 230. Further, since the two seals 249 and 259 have the same friction areas located on the same right cylinder 253, and since the interior of the chamber 241 is at the same pressure throughout, this portion of the flared shutter 248 closing the opening 247 is thus itself also subjected to equal and opposite pressures, namely the pressure in the chamber 218, and the pressure in the bore 241 which is generally atmospheric pressure. Thus all the parts of the valve plate 227, the link means 233 of the flared shutter 248 in the opening 247 and the flared shutter 248 itself are all subjected to forces which are in equilibrium, leaving friction as the only force to be overcome by the means of moving the valve plate 227. This friction is between the two walls of the plate 227 and the portion 210 of the piston means 206 along planes 234 and 235 and the friction at the seals 249 ad 250 along their respective cylindrical rubbing surfaces. Given that the parts are immersed in oil, resistance to movement is small.

The means for displacing the shaft 240 are not shown in FIG. 2, but one example of suitable means is described below in greater detail with reference to FIG. 8. With reference to FIG. 2, the following features of the invention can be observed:

a valve plate 227 co-operating with a wall portion 210 delimited between two chambers (respectively the chamber 208 and the chamber 218);

a continguous auxiliary chamber 242 having an opening leading to one of the said two chambers (the chamber 218 in the present case);

the shutter means 248 serving to close a circular opening 247;

link means 233 linking the shutter 248 to the wall of the valve plate 227; and means for controlling valve plate movement, i.e. the shaft 240.

In the embodiment shown in FIG. 2, the seals 249 and 250 mentioned above, are generally constituted by elastomer sealing rings requiring to be pressed with friction against the facing surfaces over which they move.

Very generally, such sealing rings give good results, but leaks sometimes appear after a period of use. It is thus of interest, in some cases, to replace such sealing rings with bellows such as those shown in FIGS. 3A and 3B which show two ways of making such seals with bellows having their ends welded to the two parts which are to move relative to one another.

Figure 3:
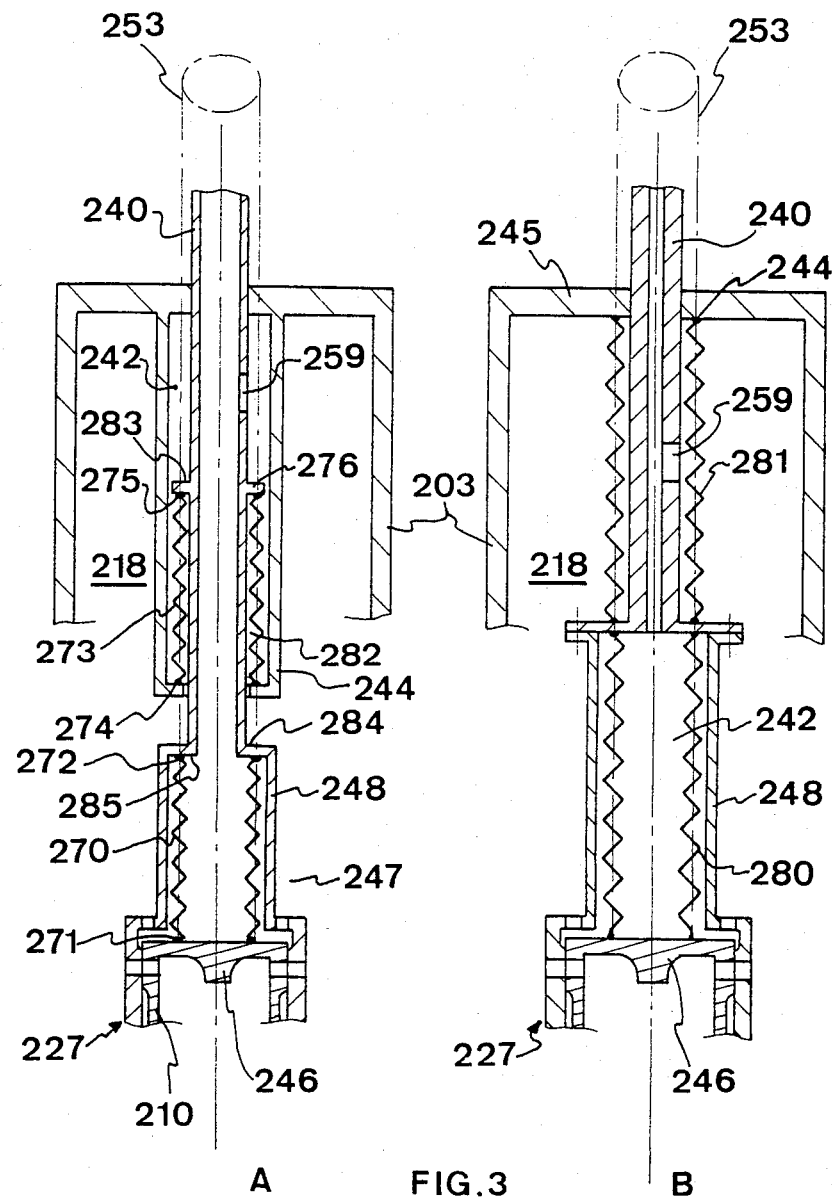
FIGS. 3A and 3B are sections through two variants of a pair of seals used in the FIG. 2 embodiment.

FIG. 3A shows a portion of the control shaft 240 in the auxiliary chamber 242, the portion 244 of the rod 203 and finally the head 246 of the wall 210 of the piston means 206. As before, it is necessary to have two sealing regions to seal the circular opening 247 through which there passes the flared skirt or shutter 248 of shaft 240.

Thus the two seals are constituted by a first bellows 270 having one end 271 welded to the head 246 and its other end 272 welded to the shutter 248, and a second bellows 273 having one end 274 welded to the wall 244 and its other end 275 welded to the control shaft 240 via a collar 276.

The places at which the ends of the two bellows 270 and 273 are welded, and the average positions of the zig-zag walls thereof are in accordance with the invention, being made on closed curves which lie, as mentioned before, on the same right cylindrical surface, in particular, and as illustrated, on the same right circular cylindrical surface. This surface 253 is shown in chain-dotted lines in FIGS. 2, 3A and 3B.

To balance the shutter as shown in FIG. 3A, the pressures applied thereto are equal and opposite, and in particular the pressure in the space 282 between the bellows 273 and the shutter 248 on the end 283 is compensated by the same pressure acting on the wall portion 284, while the pressure exerted in the chamber 242 on the end 283 is compensated by the shutter portion 285 which is still subjected to the same pressure in the chamber 242, in particular because of the opening 259 as explained above.

With such an arrangement of bellows, the valve is controlled by translation of the control shaft 240. Since the two bellows in this embodiment are connected in series, they are both subjected to the same deformation whether it consists in elongation or in contraction. However, in the same manner as the elastomer seals, they enable pressures to be maintained in equilibrium, particularly on the control shaft 240. The connections at the ends of the two bellows and the average positions of their zig-zag walls correspond functionally to the friction curves on the sealing rings such as the elastomer sealing rings on their respective complementary surfaces as illustrated in FIG. 2.

In the FIG. 3A embodiment both of the bellows are subjected to the same deformation since they are connected in series and they deform in the same direction. However, it can be advantageous in some cases to use the same sealing means as that shown in FIG. 3A for the shutter 248, but to arrange for the two bellows to operate in push-pull opposition so that when the control shaft 240 is moved in translation, it compresses one of the bellows while expanding the other and vice versa.

FIG. 3B shows two such bellows 280 and 281 which are both mounted in much the same way: one end of each of the bellows is mounted in common with the corresponding end of the other bellows on the control shaft 240. The other end of the bellows 280 is mounted on the head 246 of the piston means 206, and the other end of the bellows 281 is mounted on the wall 244 of the rod 203, and may even be mounted to the end 245 thereof. The auxiliary chamber 242 is defined by the shaft 240 and the bore 241 which is open to the atmosphere as before to ensure uniform pressure therein, which pressure is in communication via the orifice 259 with the interior of the bellows 281 and the outside surface of the shaft 240.

Thus, the FIG. 3B arrangement shows that the shutter 248 is properly balanced being in equilibrium between equal pressures applied on either side of the same surfaces as mentioned with respect to FIG. 3A.

Naturally the space between the bellows 281 and the control shaft 240 must be at the same pressure as the pressure in the bore 241, as provided for by the orifice 259.

Looking at the FIG. 2 embodiment, the shutter control means are constituted by a shaft 240 on which external means act to obtain shaft translation or shaft rotation, or indeed both at once.

In this case, the seals 249 and 250, which may be elastomer sealing rings, rub against the facing surfaces with which they are required to maintain sealing.

Even though such seals are usually bathed in oil, they may deteriorate little by little, thereby giving rise to leaks through the supposedly sealed passages. Thus, in some applications it can be of interest to reduce the possibilities of friction between said sealing rings and the facing surfaces.

Figure 4:
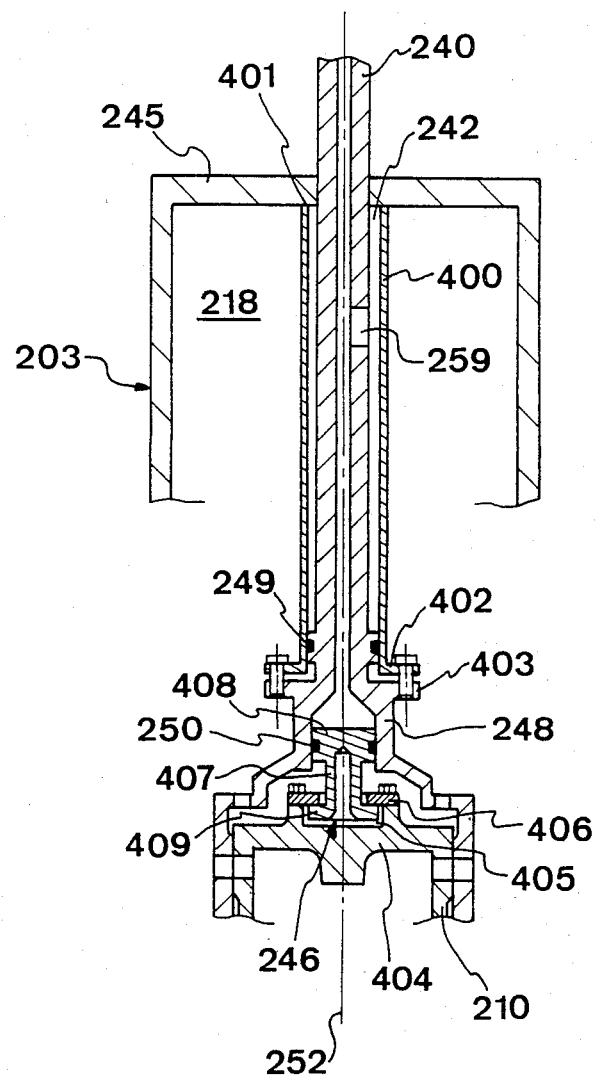
FIG. 4 is a section through a variant valve control shaft and its attendant seals.

FIG. 4 shows a portion of an embodiment of this type, which is substantially the same as the FIG. 2 embodiment, and likewise uses elastomer rings for sealing. However, the elastomer rings do not slide over the co-operating surfaces with which they maintain sealing.

The bulk of the shock absorber has not been shown in order to simplify the drawing. Thus, many of the details missing from FIG. 4 can be deduced from FIG. 2. FIG. 4 only shows the parts that differ between the two embodiments. More particularly, the wall 244 which defines the boundary between the auxiliary chamber 242 and the chamber 218 is constituted in this case by a thin wall 400 which acts as a torsion tube having one end 401 fixed to the underside of the top 245 of the rod 203, and having its other end 402 fixed by any suitable means, e.g. nuts and bolts, to a collar 403 which projects from the shutter 248.

In this case, the seal 249 is considered to be fixed relative to the end 402 of the wall 400.

However, the head 246 which is associated with the right cylindrical wall 210 of the piston means, is no longer fixed to the top 404 of the wall 210, but is held captive in a groove 405, e.g. by a washer 406 which surrounds a narrow upper portion 408 of the head 246, said upper portion carrying the sealing ring 250.

This arrangement in which the head 246 is not fixed enables the head to rotate about the axis 252, but prevents it from moving in translation because of a foot 409 which abuts against the washer 406.

Under these conditions, the seal 250 may be considered as being fixed relative to the shutter 248, and it is the foot 409 which pivots, when necessary, relative to the top 404 of the cylindrical wall 210.

The foot 409's pivoting may be helped by means such as a needle bearing immersed in the oil of the chamber 218.

Naturally, in the embodiment shown in FIG. 4, the means for moving the valve plate relative to the piston means, and more particularly relative to the right cylindrical wall 210 can only operate in rotation.

To do this, the control shaft 240 is associated with means enabling it to rotate about its own axis. The rotation is made possible by the natural flexibility and elasticity of the torsion shaft 400, and by the above-described fixings.

Under such conditions, the sealing rings 249 and 250 are driven by the same rotation as the control shaft 240 as is the shutter 248 which is fixed to the shaft 240.

Naturally, if rubbing occurs between the foot 409 and the washer 406, the sealing ring 250 may itself be rotated slightly relative to the shutter 248, but under no circumstances will it be rotated as much as in the FIG. 2 embodiment. Because of this, since the relative rotations of the sealing rings 249 and 250 are limited in the present embodiment, the life times of these rings are considerably increased relative to the embodiment shown in FIG. 2.

Naturally, in some applications, it is not always possible to control the throttling of the fluids being compressed or expanded simply by rotating a valve, both translation and rotation may be necessary.

In the embodiment shown in FIG. 2, the valve means are made so that they can pivot or rotate in the chambers 218 and 214, which means that to delimit both of these chamber stages, it is necessary to use a rotary seal 212, 236, for example, to avoid fluid communication between said two chambers which, as explained above, constitute the two working chambers for throttling the hydraulic fluid in compression or in expansion as the case may be.

Figure 5:
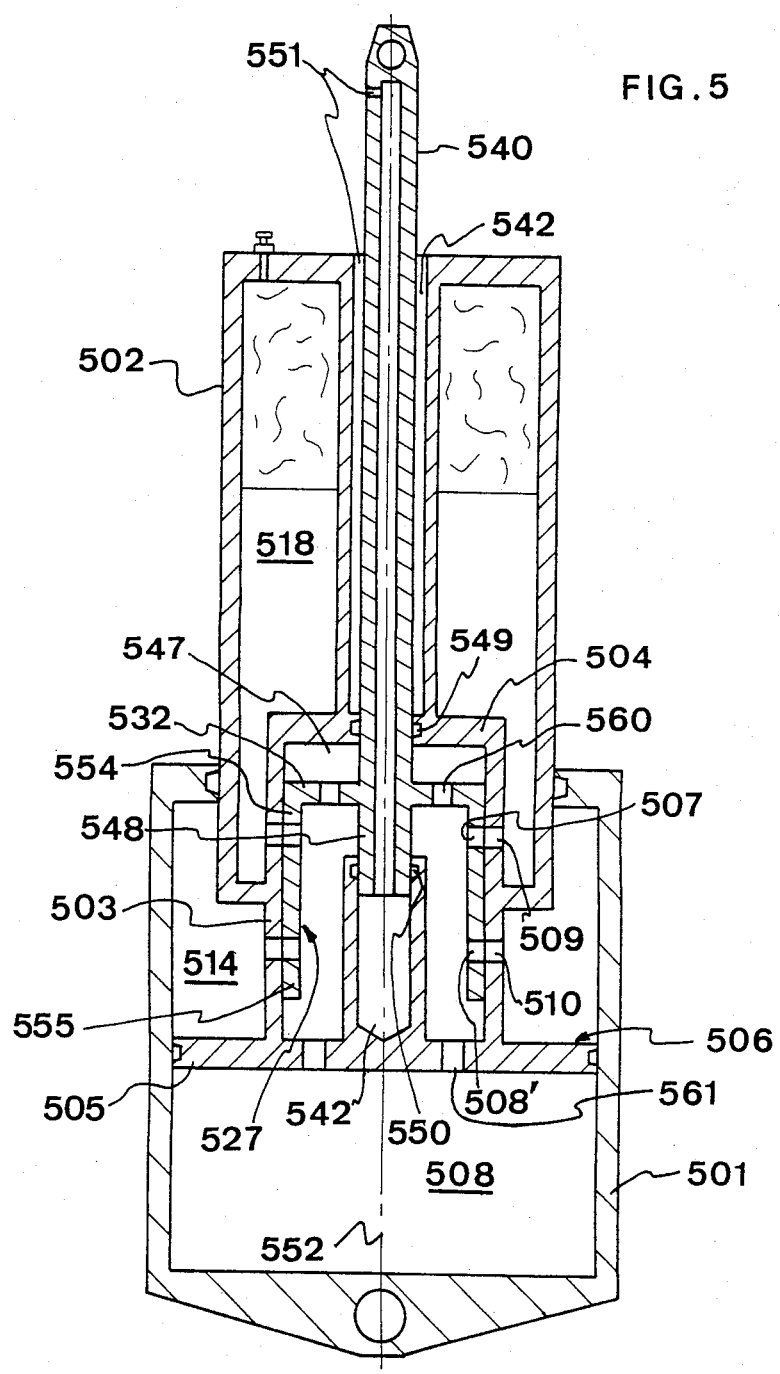
FIG. 5 is a section through a second embodiment of the invention in which several of the FIG. 2 means are inverted.

The embodiment shown in FIG. 5 avoids the need for a rotary seal.

In the FIG. 5 embodiment, the valve means 527 is constituted by a portion of right cylindrical wall which, in the present embodiment, is situated only inside the chamber 508 defined between the piston means 506 and the end of the cylinder 501.

As in the previously described embodiments, the piston means 506 are essentially constituted by walls 503, 504 and 505 defining two chambers 514 and 518, the first of which is in the upper portion of the cylinder 501 and the second of which is in the hollow rod 502.

These three chambers are equivalent to the chambers defined with reference to FIG. 2.

The cylindrical wall 527 is a wall of uniform thickness comprising two stages 554 and 555 which are both of the same diameter and which constitute parts of the same right circular cylinder about the axis 552.

These two stages comprise communication means 507 and 508 corresponding to communication means 509 and 510 through the cylindrical wall of the piston means 506.

The auxiliary chamber 542 includes an opening 547 in the same manner as before to enable the shutter 548 to carry link means 532 for linking the cylindrical wall of the valve means 527 to the shutter 548.

The opening 547 which co-operates with the shutter 548 is kept constantly closed by the shutter and sealing is provided by two sealing rings 549 and 550 which, in this embodiment, are fixed to the piston means.

Naturally, the auxiliary chamber 542 is maintained at a constant pressure, e.g. atmospheric pressure, by means of an orifice 551 made in the top of the control shaft 540.

The essential characteristic of this embodiment is that the shutter is constituted by a circular cylindrical member which is on the same side of both of the sealing rings 549 and 550, unlike the FIG. 2 embodiment where the shutter is inside one of the rings and outside the other.

Nonetheless, the same basic shock absorbing means are provided in the FIG. 5 shock absorber as in the FIG. 2 shock absorber, namely the auxiliary chamber 542, the opening 547 which is closed by the shutter 548, a chamber in which the valve means move and in which they co-operate with openings 509 and 510 made in a wall separating the chamber 508 from at least one other chamber 518, 514 for the purpose of adjusting the damping provided by the shock absorber by varying the throttling of the fluid flowing through the orifices 509 and 510 by moving the valve means 527 relative thereto.

Further, since the valve means 527 is in the form of a right cylindrical wall in a single chamber 508 in which there is only one pressure (by virtue of orifices 560 and 561 through the link means 532), the pressure exerts an equal and opposite effect on each of the ends of the valve means 527. Also, since the sealing lines of the two seals 549 and 550 are on the same right cylindrical surface (which in this case is a circular cylindrical surface) and since the pressure in the auxiliary chamber 542 is likewise the same on either side of these seals and acts on opposite ends of the same moving part, there is no net pressure-induced force hindering translation of the control shaft.

The FIG. 5 shock absorber operates in exactly the same way as the FIG. 2 shock absorber, and its operation is therefore not described further.

However, as mentioned above, it may be necessary to obtain independently controllable throttling between the chamber 508 and each of the chambers 514 and 518, in other words to provide different damping conditions depending on whether the rod is moving into or out from the cylinder.

Figure 6:
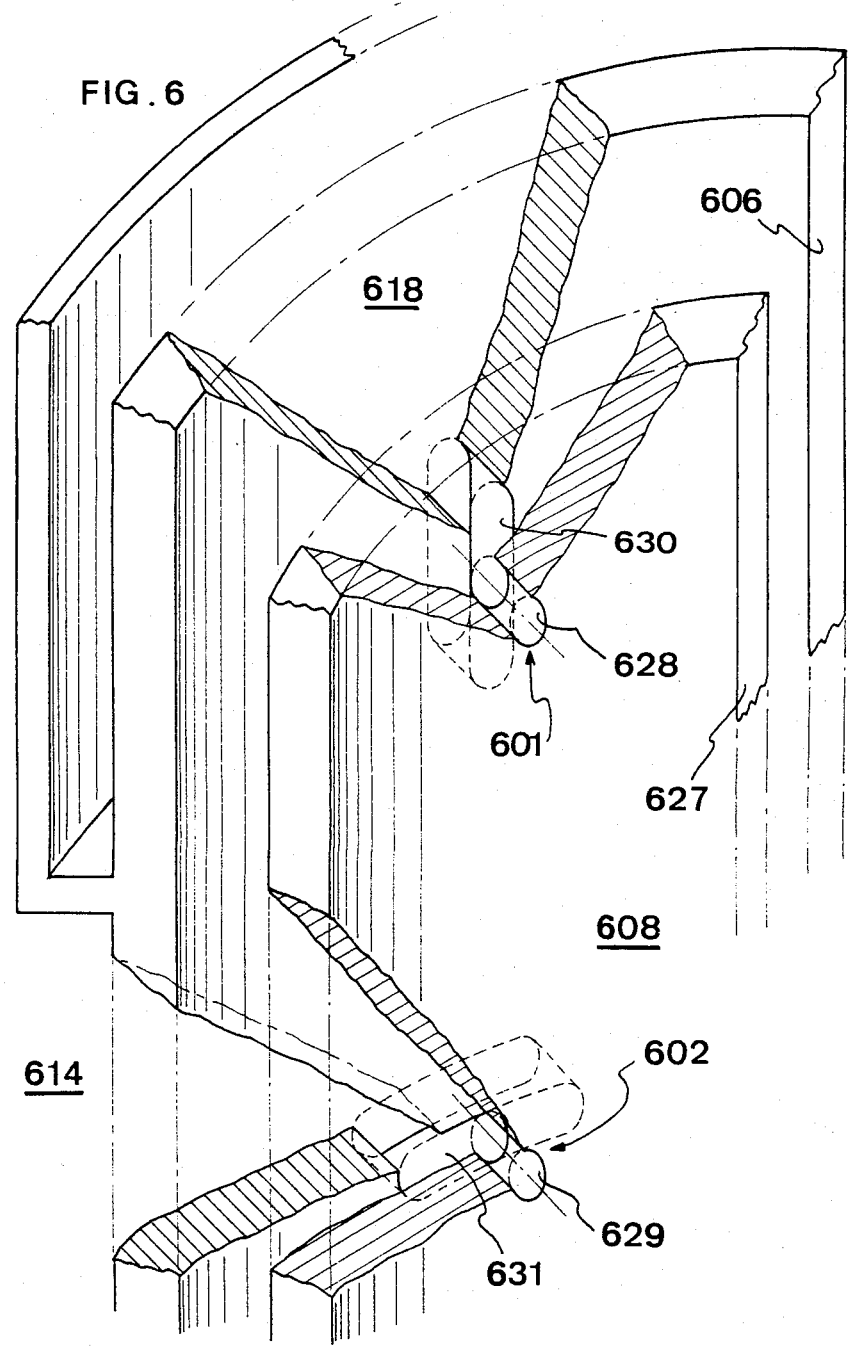
FIG. 6 is a diagrammatic perspective view on a greater scale than the preceding figures through a portion of an advantageous valve plate useable in either of the embodiments shown in FIGS. 2 and 5.

FIG. 6 shows a portion of the shock absorbers shown in FIGS. 2 and 5. In particular, it shows two throttling stages: a first throttling stage 601 enabling fluid to pass between the chamber 608 (taken to be the chamber at the bottom of the cylinder) and the chamber 618 in the rod; and a second throttling stage 602 enabling fluid to flow between the chamber 608 and the chamber 614 in the upper part of the cylinder between the outside wall of the rod and the inside wall of the cylinder.

Thus the valve means 627 comprise two orifices 628 and 629 of circular section and of given diameter $\phi$.

However, the orifices 630 and 631 through the piston means 606 for co-operating with the valve means orifices 628 and 629 are oblong rather than circular. The width of the oblong orifices is substantially equal to the diameter $\phi$, but the length in each case is considerably greater.

FIG. 7 comprises four diagrams A, B, C, and D showing four different throttling positions for a shock absorber in accordance with the invention, and corresponding to the embodiment shown in FIG. 5, for example.

In FIG. 7 diagram A, the shock absorber has its valve means 627 in an open or rest position relative to the piston means 606. In this case, the orifices 628 and 629 are placed opposite to the oblong orifices 630 and 631 in such a manner that the entire cross section of each of the valve means orifices 628 and 629 is left completely open by the oblong orifices.

However, in the event of a shock causing the rod to move into the cylinder, it is necessary for the fluid flow from the chamber 608 to the chamber 618 to be throttled, while the fluid flow from the chamber 608 to the chamber 614 is not throttled. This arrangement is shown in diagram B.

Since the long axes of the two stages of oblong orifices are substantially perpendicular to each other (this is the preferred configuration, but any other reasonable non-zero angle would do), rotating the valve means 627 will cause the round orifice 628 to move away from the long axis of the corresponding oblong orifice 630 thereby partially closing the round orifice 628, while the other round orifice 629 merely moves along the long axis of its corresponding oblong orifice 631 and remains fully open. Thus the position shown in diagram B has free flow via the orifice 629 while the flow through the orifice 628 is restricted to a segment of a circle 640. Under such conditions and during a compression stroke, only the fluid flow from the chamber 608 to the chamber 618 is throttled while the flow from the chamber 608 to the chamber 614 is substantially unhindered.

After the shock is over, and as explained above, the fluid spring action of the shock absorber tends to return it to its equilibrium condition, in which case throttling needs to be applied to the fluid flow from the chamber 614 back to the chamber 608, while far less throttling needs to be applied to the return flow from the chamber 618 to the chamber 608. The appropriate configuration is shown in diagram C. In this case the valve means is moved from its rest position in translation, e.g. by pulling the control shaft 640, thereby causing the round orifice 628 to move along the corresponding oblong orifice 630 and hence keeping the round orifice 628 fully open, while the round orifice 629 is moved away from the long axis of the corresponding oblong orifice 631 reducing the flow passage to a segment 641.

This configuration thus throttles the fluid flowing from the chamber 614 to the chamber 608.

Clearly such an arrangement requires the valve means 627 to be controlled selectively so that it is rotated if the shock absorber is being compressed by a shock and so that it is translated if it is returning to its equilbrium condition after such a compressive shock.

In some cases it can be necessary to throttle both fluid passages at the same time, in which case the valve means 627 can be both translated and rotated at the same time as shown in diagram D.

The preceding description has been concerned with control shafts that needed moving in translation or in rotation or in both, but has not described means suitable for applying such control displacements thereto.

Figure 8:
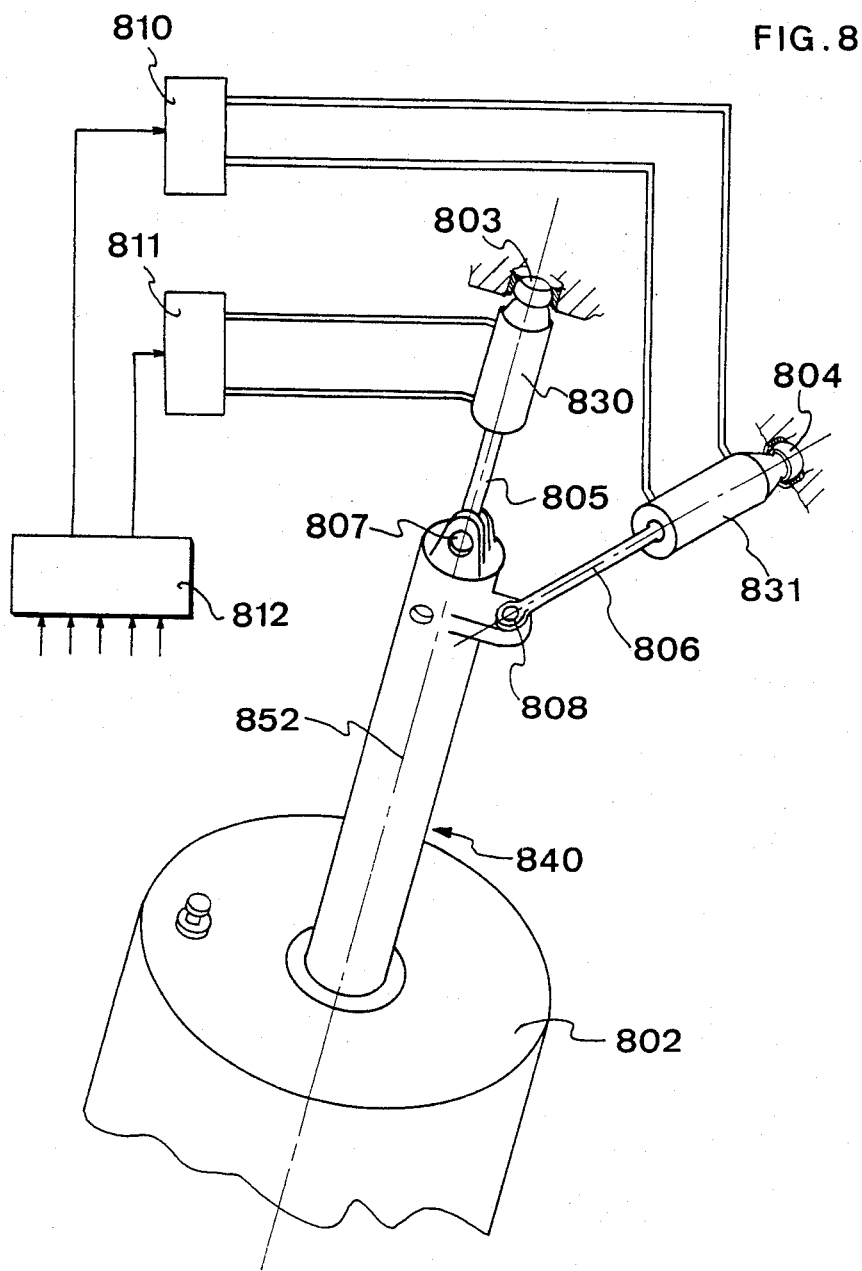
FIG. 8 is a diagrammatic perspective view of control means for operating the valve used in either of the embodiments shown in FIGS. 2 to 7.

FIG. 8 is a highly diagrammatic perspective view of such control means. Two jacks 830 and 831 are coupled to the control shaft 840 for controlling valve means (not shown) inside a sliding rod 802. Both of the jacks have their cylinder ends connected via respective knuckle joints 803 and 804 to suitably located anchor points and have rods 805 and 806 whose projecting ends are connected to the control shaft 840 via coupling pins 807 and 808. The anchor points 803 and 804 are fixed relative to the rod 802.

Thus respective jack-controlling source 810 and 811 can be selectively controlled by any suitable data processing means 812. For example, the jack 830 may be powered to cause the rod 805 to move into its cylinder, thereby causing the control shaft 840 to move in translation, or alternatively the source 810 may be controlled to move the rod 806 into or out from its cylinder causing control shaft 840 to rotate about its axis 852 by virtue of the short lever arm connecting the excentric coupling pin 808 thereto.

The above means are not described in greater detail since they are fully described in prior documents such as the present assignee's above-mentioned patent application.

We claim:

1. A shock absorber comprising:

a cylinder;

a rod slidably mounted in said cylinder;

piston means fixed to said rod and slidable inside said cylinder, and defining, in conjunction with said cylinder, at least two chambers of volume which is variable as a function of the displacement of the rod in the cylinder, said piston means including a first wall portion disposed between said chambers, said first wall portion being in the shape of a right cylinder;

at least one first communication orifice in said first wall portion to enable a fluid to pass from one chamber to the other;

at least one auxiliary chamber having at least a second wall portion which is common to at least one of said two chambers;

an opening in said second wall portion;

a shutter closing said opening and moving relative to said opening while keeping it constantly closed, said opening being sealed by means including two spaced seals, said seals being so shaped that their respective contacting curves providing sealing are situated on a common right cylindrical surface;

a moving valve member suitable for moving over said first wall portion in friction to close said at least one communication orifice by an amount determined as a function of its displacement;

link means connecting said shutter to said valve member in such a manner that displacement of the shutter causes corresponding displacement of the valve member; and means for controlling the displacement of said shutter.

2. A shock absorber according to claim 1, wherein said moving valve member is completely located to one side of said opening.

3. A shock absorber according to claim 1, wherein said shutter passes from said auxiliary chamber to the outside thereof through said opening, said shutter having a flared portion which comes into contact with the edges of said opening for closing thereof.

4. A shock absorber according to claim 1, wherein the seals are friction seals.

5. a shock absorber according to claim 1, wherein said seals are constituted by bellows.

6. A shock absorber according to claim 5, wherein said bellows are mounted in series.

7. A shock absorber according to claim 5, wherein said bellows are mounted in push-pull opposition for compression of one of said bellows while expanding another of said bellows.

8. A shock absorber according to claim 1, wherein said second wall portion comprises a thin walled member having a degree of resilience.

9. A shock absorber according to claim 8, comprising means for connecting said shutter to one end of said thin walled second wall portion, said one end not being rigidly held.

10. A shock absorber, comprising:
a hollow cylinder;
a hollow rod slidably mounted in said cylinder;
piston means fixed to said rod to constitute, together with said cylinder and said rod, at least three chambers, said piston means comprising at least a first right cylindrical wall between at least one first chamber and at least two other, second and third, chambers, said first wall having first and second parts of different diameters, said first part separating the first and the second chambers and said second part separating the first and the third chambers;
first and second communication means provided through said first and second parts of said first wall;
valve means comprising at least a second right cylindrical wall including third and fourth parts suitable for sliding over said first and second parts respectively of said first wall, and respectively in at least said second and third chambers, said first through fourth parts of said first and second wall portions defining an annular space forming part of said second chamber;
third and fourth communication means provided through said third and fourth parts respectively of said second wall portion and suitable for co-operating with said first and second communication means respectively, whereby the amount of fluid communication between the chambers can be varied in determined manner by sliding said second wall portion over said first wall portion;
an auxiliary chamber having at least one opening communicating with said second chamber;
a shutter movable relative to said opening and for keeping it sealed by means of two seals defining two sealing curves, said curves lying on a common right cylindrical surface, the ends of said shutter co-operating with respective ones of said seals and being situated on opposite sides of said right cylindrical surface whereby one end is inside the second chamber and the other end is inside the auxiliary chamber;
link means connecting said shutter to said valve means in such a manner that displacement of said shutter causes a corresponding displacement of said valve means; and
means for controlling displacement of said shutter.

11. A shock absorber, comprising:
a hollow cylinder;
a hollow rod slidably mounted in said cylinder;
piston means fixed to said rod to constitute, together with said cylinder and said rod, at least three chambers, said piston means comprising at least a first right cylindrical wall between at least one first chamber and at least two other, second and third, chambers, said first wall having first and second parts, said first part separating the first and the second chambers and said second part separating the first and the third chambers;
first and second communication means provided through said first and second parts of said first wall;
valve means comprising at least a second right cylindrical wall including third and fourth parts suitable for sliding over said first and second parts respectively of said first wall, and located in said second chamber;
third and fourth communication means provided through said third and fourth parts respectively of said second wall portion and suitable for co-operating with said first and second communication means respectively, whereby the amount of fluid communication between the chambers can be varied in determined manner by sliding said second wall portion over said first wall portion;
an auxiliary chamber having at least one opening communicating with said second chamber;
a shutter movable relative to said opening and for keeping it sealed by means of two seals defining two sealing curves, said curves lying on a common right cylindrical surface, the ends of said shutter co-operating with respective ones of said seals;
link means connecting said shutter to said valve means in such a manner that displacement of said shutter causes a corresponding displacement of said valve means; and
means for controlling displacement of said shutter.

12. A shock absorber according to claim 10, wherein said communication means comprise two orifices of different cross section.

13. A shock absorber according to claim 10, wherein said communication means include orifices of circular section and orifices of oblong section.

14. A shock absorber according to claim 10, wherein said communication means include orifices of circular section and orifices of oblong section with the diameter of the circular section orifices being substantially equal to the width of said oblong section and with the length of said oblong section being considerably larger than said diameter.

15. A shock absorber according to claim 10, wherein said communication means include orifices of oblong section divided into at least two groups such that there is a non zero angle between the long axes of the oblong orifices of the different groups.

16. A shock absorber according to claim 10, wherein said communication means include orifices of oblong section divided into at least two groups such that there is an angle of substantially 90° between the long axes of the oblong orifices of the different groups.

17. A shock absorber according to claim 11, wherein said communication means comprise two orifices of different cross section.

18. A shock absorber according to claim 11, wherein said communication means include orifices of circular section and orifices of oblong section.

19. A shock absorber according to claim 11, wherein said communication means include orifices of circular section and orifices of oblong section with the diameter of the circular section orifices being substantially equal to the width of said oblong section and with the length of said oblong section being considerably larger than said diameter.

20. A shock absorber according to claim 11, wherein said communication means include orifices of oblong section divided into at least two groups such that there is a non zero angle between the long axes of the oblong orifices of the different groups.

* * * * *